United States Patent
Kim et al.

(10) Patent No.: US 11,017,567 B2
(45) Date of Patent: May 25, 2021

(54) DYNAMIC CONTENT PROVIDING METHOD AND SYSTEM FOR FACE RECOGNITION CAMERA

(71) Applicant: Snow Corporation, Seongnam-si (KR)

(72) Inventors: Jimin Kim, Seongnam-si (KR); Sangho Choi, Seongnam-si (KR); Byung-Sun Park, Seongnam-si (KR); Junghwan Jin, Seongnam-si (KR); Wonhyo Yi, Seongnam-si (KR); Hyeongbae Shin, Seongnam-si (KR); Seongyeop Jeong, Seongnam-si (KR); Sungwook Kim, Seongnam-si (KR); Noah Hahm, Seongnam-si (KR)

(73) Assignee: SNOW Corporation, Gyeonggi-do (KR)

( * ) Notice: Subject to any disclaimer, the term of this patent is extended or adjusted under 35 U.S.C. 154(b) by 0 days.

(21) Appl. No.: 16/577,632

(22) Filed: Sep. 20, 2019

(65) Prior Publication Data
US 2020/0013195 A1     Jan. 9, 2020

Related U.S. Application Data

(63) Continuation of application No. PCT/KR2017/003061, filed on Mar. 22, 2017.

(51) Int. Cl.
*G06T 11/00* (2006.01)
*H04N 5/272* (2006.01)
*G06K 9/00* (2006.01)

(52) U.S. Cl.
CPC .......... *G06T 11/00* (2013.01); *G06K 9/00275* (2013.01); *H04N 5/272* (2013.01)

(58) Field of Classification Search
CPC ........ H04N 5/272; G06T 11/60; G06T 19/006
See application file for complete search history.

(56) References Cited

U.S. PATENT DOCUMENTS

| | | | |
|---|---|---|---|
| 9,087,131 B1 * | 7/2015 | Gundotra | G06F 16/951 |
| 9,594,947 B1 | 3/2017 | Kotagiri et al. | |
| 2004/0008874 A1 * | 1/2004 | Koike | G06K 9/00281 |
| | | | 382/118 |

(Continued)

FOREIGN PATENT DOCUMENTS

| | | |
|---|---|---|
| CN | 102231801 A | 11/2011 |
| CN | 104137533 A | 11/2014 |

(Continued)

OTHER PUBLICATIONS

International Search Report dated Dec. 14, 2017 issued in International Application No. PCT/KR2017/003061.

(Continued)

*Primary Examiner* — Phi Hoang
(74) *Attorney, Agent, or Firm* — Harness, Dickey & Pierce, P.L.C.

(57) ABSTRACT

A dynamic content providing method performed by a computer-implemented dynamic content providing system including recognizing a facial region in an input image, extracting feature information of the recognized facial region, and dynamically synthesizing an image object of content based on the feature information, the content being synthesizable with the input image may be provided.

18 Claims, 10 Drawing Sheets

(56) References Cited

U.S. PATENT DOCUMENTS

| | | | | |
|---|---|---|---|---|
| 2005/0079474 A1* | 4/2005 | Lowe | ................... | A61B 5/165 |
| | | | | 434/236 |
| 2010/0054692 A1* | 3/2010 | Naruse | ................ | G11B 27/034 |
| | | | | 386/278 |
| 2012/0223956 A1* | 9/2012 | Saito | ................... | G06F 3/0481 |
| | | | | 345/582 |
| 2013/0223695 A1* | 8/2013 | Park | ................. | G06K 9/00228 |
| | | | | 382/118 |
| 2017/0139911 A1* | 5/2017 | Qiao | ................. | G06K 9/00288 |
| 2017/0221371 A1* | 8/2017 | Yang | ................... | G06T 19/006 |

FOREIGN PATENT DOCUMENTS

| | | |
|---|---|---|
| JP | 2012-151544 A | 8/2012 |
| JP | 2015-146566 A | 8/2015 |
| JP | 2016-28463 A | 2/2016 |
| KR | 10-2007-0027175 A | 3/2007 |
| KR | 10-2012-0119244 A | 10/2012 |
| KR | 10-2013-0022434 A | 3/2013 |
| KR | 10-2013-0096983 A | 9/2013 |
| KR | 10-2014-0010525 A | 1/2014 |
| KR | 10-1446143 B1 | 10/2014 |

OTHER PUBLICATIONS

Korean Office Action dated Jul. 30, 2020 issued in corresponding Korean Patent Application No. 10-2019-7030227.
Japanese Office Action dated Oct. 6, 2020 issued in Japanese Patent Application No. 2019-552627.
Chinese Office Action dated Mar. 22, 2021 issued in corresponding Chinese Application No. 201780088561.3.

* cited by examiner

DYNAMIC CONTENT PROVIDING METHOD AND SYSTEM FOR FACE RECOGNITION CAMERA

CROSS-REFERENCE TO RELATED APPLICATIONS

This U.S. non-provisional application is a continuation application of, and claims the benefit of priority under 35 U.S.C. § 365(c) from International Application PCT/KR2017/003061, which has an International filing date of Mar. 22, 2017 and designated the U.S., the entire contents of which are incorporated herein by reference in their entirety

BACKGROUND

1. Field

Example embodiments relate to technology for recognizing a face in a camera image and synthesizing a variety of contents with the recognized face.

2. Description of the Related Art

A character using a facial image may be an effective means of actively expressing personal characteristics of an individual. In the related art, such characters may be used as a character of, for example, an animation and a game, and/or an avatar or a profile photo that represents a user on the Internet.

A method of creating a character using a facial image may include, for example, an image extraction technique, a face recognition technique, an image synthesis technique, and an image feature point extraction technique.

SUMMARY

Some example embodiments provide methods and/or systems for providing a different synthesis result based on a feature of a face included in a camera image with respect to content synthesizable with the camera image using a face recognition camera.

Some example embodiment provide a methods and/or systems for recommending content including an object matched to a feature of a face recognized in a camera image as content synthesizable with the camera image using a face recognition camera.

According to an example embodiment, a dynamic content providing method performed by a computer-implemented dynamic content providing system, the method may include recognizing a facial region in an input image, extracting feature information of the recognized facial region, and dynamically synthesizing an image object of content based on the feature information, the content being synthesizable with the input image.

The extracting may include extracting the feature information by calculating face ratio data based on the recognized facial region.

The extracting may include calculating face ratio data based on the facial region, comparing the face ratio data to reference ratio data, and extracting the feature information based on a result of the comparing.

The extracting may include, in response to at least two facial regions being recognized in the input image, calculating face ratio data with respect to each of the facial regions, comparing the face ratio data between the facial regions, and extracting the feature information with respect to each of the at least two facial regions based on a result of the comparing.

The dynamically synthesizing may include synthesizing the content with the input image, and providing a different synthesis result with respect to the content based on the feature information in the input image.

The dynamically synthesizing may include synthesizing the image object of the content at a position corresponding to the feature information in the input image.

The dynamically synthesizing may include applying an effect corresponding to the feature information while synthesizing the image object of the content with the input image.

The dynamically synthesizing may include, in response to at least two facial regions being recognized in the input image, synthesizing the content with each of the facial regions, and providing a different synthesis result with respect to each of the at least two facial regions based on the feature information of a corresponding one of the at least two facial regions.

The dynamically synthesizing may include recommending the content to be synthesizable with the input image based on the feature information.

The recommending may include providing a content list including the image object corresponding to the feature information.

According to an example embodiment, a non-transitory computer-readable recording medium having computer program recorded thereon, which when executed by a computer, cause the computer to perform a dynamic content providing method, which includes recognizing a facial region in an input image, extracting feature information of the recognized facial region, and dynamically synthesizing an image object of content based on the feature information, the content being synthesizable with the input image.

According to an example embodiment, a computer-implemented dynamic content providing system includes at least one processor, which is configured to recognize a facial region in an input image, extract feature information of the recognized facial region, and dynamically synthesize an image object of content based on the feature information, the content being synthesizable with the input image.

According to some example embodiments, it is possible to provide a different synthesis result based on a feature of a face included in a camera image with respect to content synthesizable with the camera image using a face recognition camera.

According to some example embodiments, it is possible to recommend content including an object matched to a feature of a face recognized in a camera image as content synthesizable with the camera image using a face recognition camera.

BRIEF DESCRIPTION OF DRAWINGS

Example embodiments will be more clearly understood from the following brief description taken in conjunction with the accompanying drawings. The accompanying drawings represent non-limiting, example embodiments as described herein.

DETAILED DESCRIPTION

Hereinafter, example embodiments are described with reference to the accompanying drawings.

Example embodiments relate to technology for recognizing a face in a camera image and synthesizing a various pieces of content with the recognized face.

The example embodiments described in this disclosure may relate to providing dynamic content with different results based on a feature of a face recognized in an image, which may lead to achieving many advantages in terms of fun factors, diversity, and efficiency.

The term "face recognition camera" used herein may indicate a camera function of automatically recognizing a face in an image (hereinafter, a camera image) captured using a camera and synthesizing content on the recognized face. Also, the term "content" may inclusively indicate a sticker, emoji, etc., synthesizable with a camera image, for example, an animal, an entertainer, a cartoon character, etc., as content including an image object. The content may be configured as a fixed object and also a moving image object to which a flash or an animation is applied.

Figure 1:
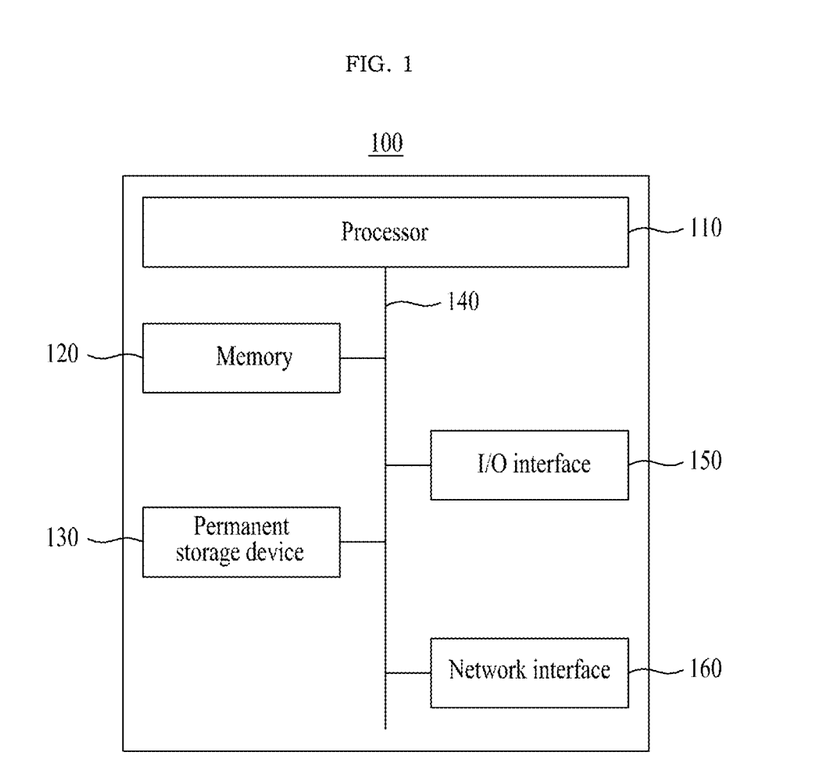
FIG. 1 is a diagram illustrating an example of a configuration of a computer system according to an example embodiment.

FIG. 1 is a diagram illustrating an example of a configuration of a computer system according to an example embodiment. For example, a dynamic content providing system according to an example embodiment may be configured through a computer system 100 of FIG. 1. Referring to FIG. 1, the computer system 100 may include a processor 110, a memory 120, a permanent storage device 130, a bus 140, an input/output (I/O) interface 150, and a network interface 160 as components to perform a dynamic content providing method.

The processor 110 may include any device capable of processing sequence of instructions or a portion thereof. The processor 110 may include, for example, a computer processor, a processor and/or a digital processor in a mobile device or another electronic device. The processor 110 may be included in, for example, a server computing device, a server computer, a series of server computers, a server farm, a cloud computer, a content platform, a mobile computing device, a smartphone, a tablet, a set-top box, and the like. The processor 110 may be connected to the memory 120 through the bus 140.

The memory 120 may include a volatile memory, a permanent memory, a virtual memory, or other memories configured to store information used by or output from the computer system 100. The memory 120 may include, for example, random access memory (RAM) and/or dynamic RAM (DRAM). The memory 120 may be used to store random information, such as state information of the computer system 100. The memory 120 may be used to store instructions of the computer system 100 including instructions for controlling, for example, a face recognition camera. The computer system 100 may include at least one processor 110 if necessary or appropriate.

The bus 140 may include a communication-based mechanism that enables an interaction between various components of the computer system 100. The bus 140 may convey data between the components of the computer system 100, for example, between the processor 110 and the memory 120. The bus 140 may include wireless and/or wired communication media between the components of the computer system 100 and may include parallel, serial or other topology arrangements.

The permanent storage device 130 may include, for example, another permanent storage device or a memory used by the computer system 100 to store data during a desired extended period of time (for example, compared to the memory 120). The permanent storage device 130 may include a non-volatile main memory used by the processor 110 in the computer system 100. The permanent storage device 130 may include, for example, a flash memory, a hard disc, an optical disc, or another computer-readable recording medium.

The I/O interface 150 may include interfaces for a keyboard, a mouse, a voice instruction input, a display, or another input or output device. Configurational instructions and/or input associated with the face recognition camera may be received through the I/O interface 150.

The network interface 160 may include at least one interface for networks, such as a near field network or the Internet. The network interface 160 may include interfaces for wired or wireless accesses. The configurational instructions may be received through the network interface 160. Information associated with the face recognition camera may be received or transmitted through the network interface 160.

According to some example embodiments, the computer system 100 may include a greater number of components that a number of components shown in FIG. 1. However, there is no need to clearly illustrate many components according to the related art. For example, the computer system 100 may include at least a portion of the I/O apparatuses connected to the I/O interface 150 or may further include other components, such as a transceiver, a global positioning system (GPS) module, a camera, various types of sensors, and a database. In detail, when the computer system 100 is configured in a form of a mobile device, such as a smartphone, the computer system 100 may further include various components, for example, a camera generally included in the mobile device, an accelerometer sensor or a gyro sensor, a camera, various types of physical buttons, a button using a touch panel, an I/O port, and a vibrator for vibration.

Figure 2:
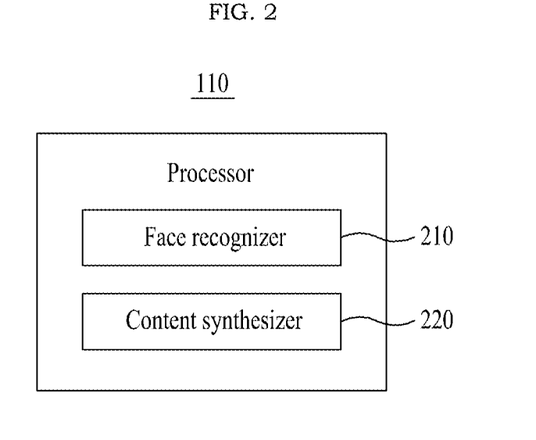
FIG. 2 is a diagram illustrating an example of a component includable in a processor of a computer system according to an example embodiment.
Figure 3:
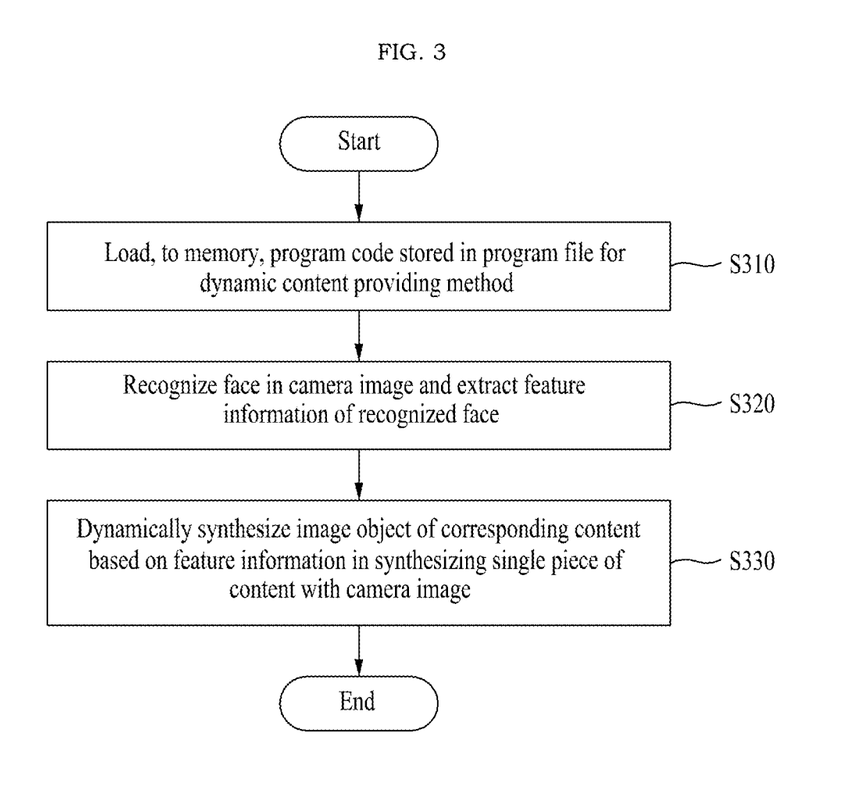
FIG. 3 is a flowchart illustrating an example of a dynamic content providing method performed by a computer system according to an example embodiment.

FIG. 2 is a diagram illustrating an example of a component includable in a processor of a computer system according to an example embodiment, and FIG. 3 is a flowchart illustrating an example of a dynamic content providing method performed by a computer system according to an example embodiment.

Referring to FIG. 2, the processor 110 may include a face recognizer 210, and a content synthesizer 220. Such components of the processor 110 may be representations of different functions performed by the processor 110 in response to a control instruction provided from at least one program code. For example, the face recognizer 210 may be used as a functional representation that the processor 110 controls the computer system 100 to perform face recognition in a camera image. The processor 110 and the components of the processor 110 may perform operations S310 to S330 included in the dynamic content providing method of FIG. 3. For example, the processor 110 and the components of the processor 110 may be configured to execute an instruction according to at least one program code and a code of an operating system (OS) included in the memory 120. Here, the at least one program code may correspond to a code of a program configured to process the dynamic content providing method.

The dynamic content providing method may not be performed in illustrated sequence. A portion of operations may be omitted or an additional operation may be further included.

In operation S310, the processor 110 may load, to the memory 120, a program code stored in a program file for the dynamic content providing method. For example, the program file for the dynamic content providing method may be stored in the permanent storage device 130 of FIG. 1, and the processor 110 may control the computer system 100 such that the program code may be loaded from the program file stored in the permanent storage device 130 to the memory 120 through the bus 140. Here, the processor 110 and the face recognizer 210 and the content synthesizer 220 included in the processor 110 may be different functional representations of the processor 110 to perform the following operations S320 and S330 by executing an instruction of a portion corresponding to the program code loaded to the memory 120. To perform operations S320 and S330, the processor 110 and the components of the processor 110 may directly process an operation or control the computer system 100 in response to the control instruction.

In operation S320, the face recognizer 210 may recognize a face in a camera image and may extract feature information of the recognized face. The face recognizer 210, as a face recognition system, may detect a facial region in a consecutively input image and may detect and track a position of, for example, a forehead, an eyebrow, an eye, nose, lips, chin, and an ear, based on the detected facial region. The face recognizer 210 may calculate face ratio data including, for example, an aspect ratio of the face, an eye size, a lip size, and/or a positional ratio of (or alternatively, a distance ratio between) forehead, eyebrow, nose end, and chin end based on a face recognition result, and may extract feature information of the face in the camera image.

Figure 4:
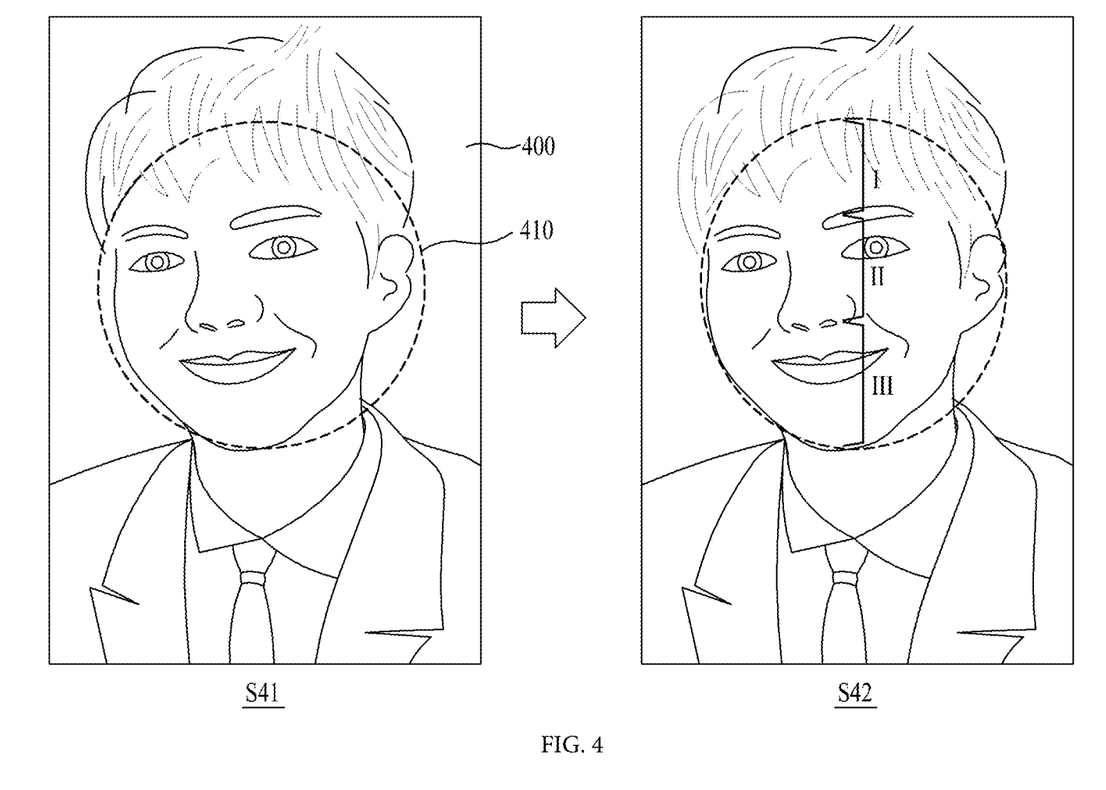
FIGS. 4 and 5 illustrate examples of a process of extracting feature information of a face in a camera image according to an example embodiment.

For example, referring to FIG. 4, when a camera image 400 is input, the face recognizer 210 may detect a facial region 410 in the camera image 400 (S41), and may divide the facial region 410 into a first section I from the forehead to the eyebrow, a second section II from the eyebrow to the nose end, and a third section III from the nose end to the chin end in (S42). The face recognizer 210 may calculate a ratio of the first section I, the second section II, and the third section III as face ratio data, may compare the calculated face ratio data to desired (or alternatively, predefined) reference ratio data, and may extract feature information based on a comparison result. That is, the face recognizer 210 may compare the ratio of the first section I, the second section II, and the third section III of the face in the camera image to the reference ratio data and may acquire feature information, such as, for example, wide forehead is wide, long nose, and long chin, compared to reference.

Figure 5:
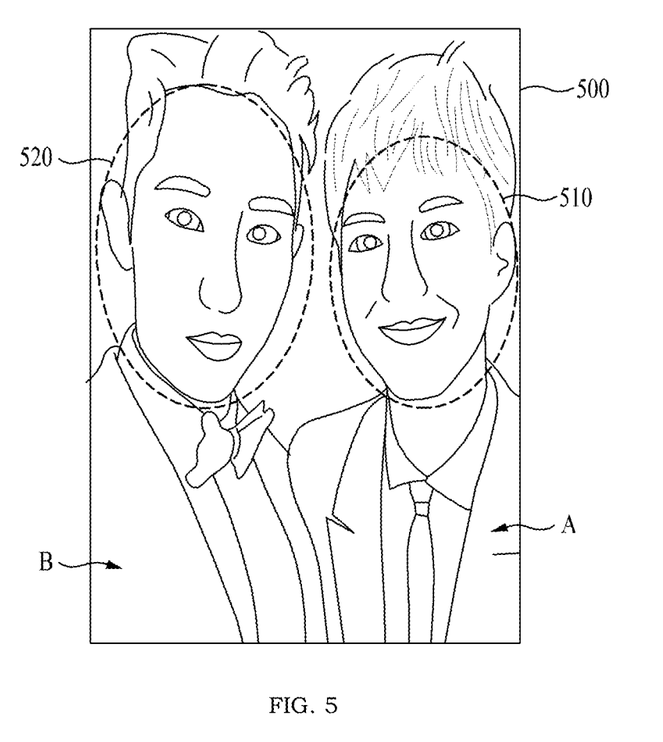

As another example, referring to FIG. 5, when at least two facial regions 510 and 520 are recognized in a camera image 500, the face recognizer 210 may calculate face ratio data with respect to each of the facial regions 510 and 520, may compare facial radio data between the facial regions 510 and 520 in the camera image 500, and may extract feature information of each of the facial regions 510 and 520 based on a comparison result. For example, feature information (e.g., a person A has a small face, big eyes, big mouth, and the like, compared to a person B) may be acquired by comparing the facial region 510 of the person A to the facial region 520 of the person B in the camera image 500.

Referring again to FIG. 3, in operation S330, the content synthesizer 220 may synthesize a single piece of content selected for synthesis with the camera image, and, here, may dynamically synthesize an image object of the corresponding content to match the feature information of the face recognized in the camera image. That is, the content synthesizer 220 may provide a different synthesis result based on a feature of the face recognized in the camera image, with respect to the single piece of content selected from among contents synthesizable with the camera image.

Figure 6:
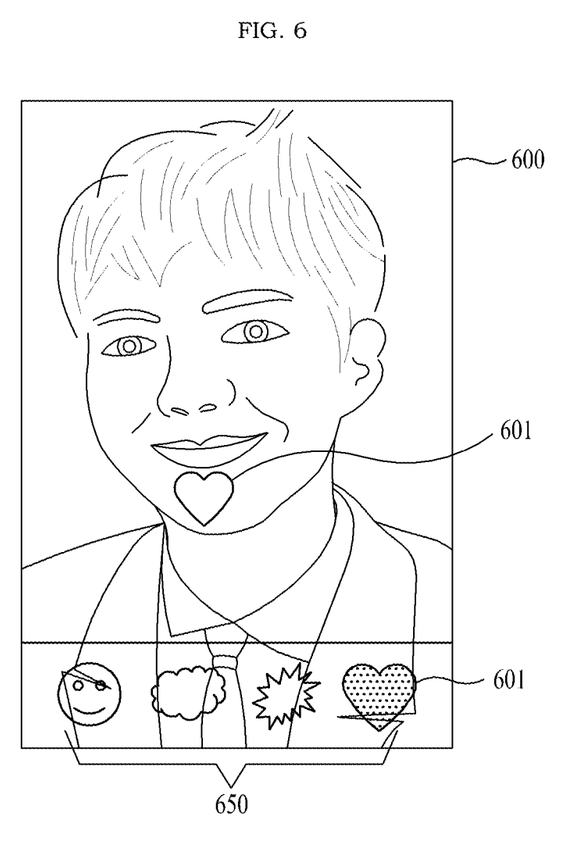
FIGS. 6 to 8 illustrate examples of a process of synthesizing content to match a feature of a face according to an example embodiment.
Figure 7:
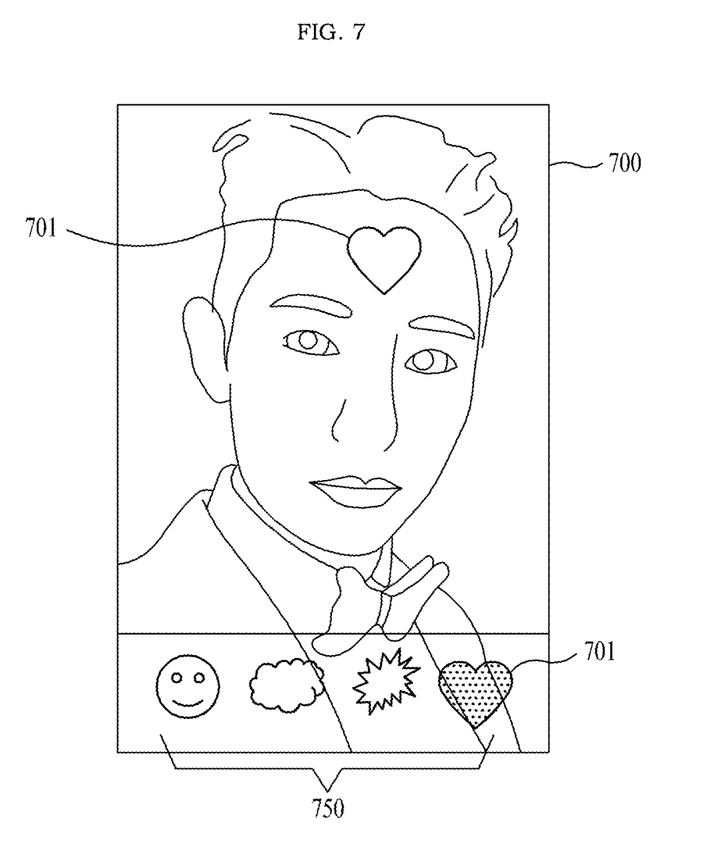
Figure 8:
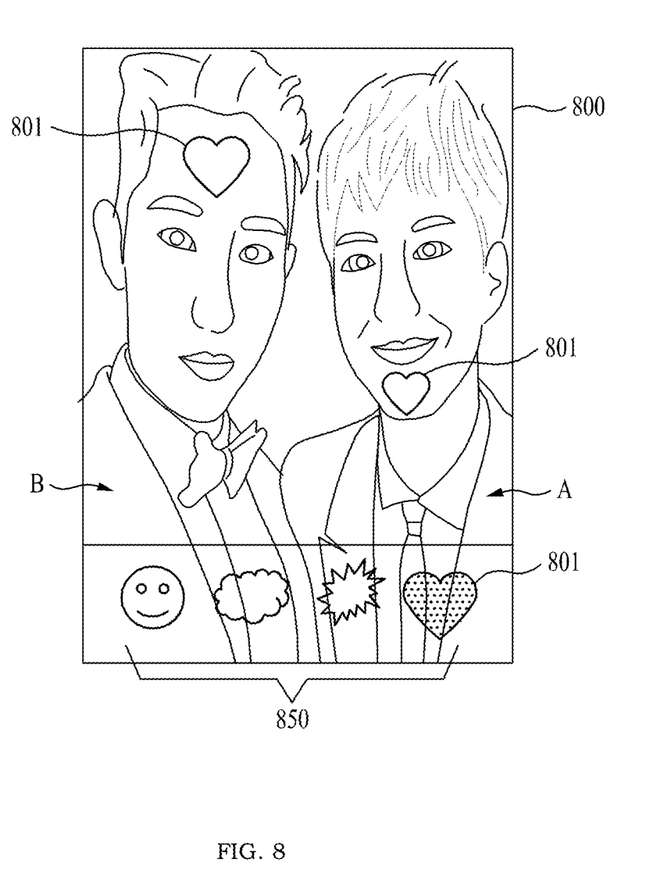

For example, the content synthesizer 220 may synthesize an image object of the selected content at a position corresponding to the feature information of the face recognized in the camera image. Referring to FIG. 6, when a face having a long chin feature is recognized in a camera image 600, the content synthesizer 220 may synthesize a sticker 601 selected from a content list 650 with a chin portion in a facial region of the camera image 600. Referring to FIG. 7, when a face having a long forehead feature is recognized in a camera image 700, the content synthesizer 220 may synthesize a sticker 701 selected from a content list 750 with a forehead portion in a facial region in the camera image 700. When at least two facial regions are recognized in a camera image, an image object of selected content may be synthesized with each of the recognized facial region. Referring to FIG. 8, when a person A having a long chin feature and a person B having a long forehead feature are recognized in a camera image 800, the content synthesizer 220 may synthesize a sticker 801 selected from a content list 850 with a chin portion on a face of the person and a forehead portion on a face of the person B for the respective corresponding facial features.

As another example, the content synthesizer 220 may synthesize an image object of selected content with a camera image and, here, may apply an effect corresponding to feature information of a face recognized in the camera image. To this end, with respect to each piece of content, a different effect may be applied (or alternatively, predefined) for each facial feature and constructed as a database and stored in the memory 120. The content synthesizer 220 may retrieve, from the database stored in the memory 120, an effect that matches feature information of a face recognized in the camera image with respect to content selected by the user and may apply the retrieved effect. For example, with respect to a single piece of content, an image object of an effect that highlights a chin portion may be synthesized in a facial region having a long chin feature and an image object of an effect that highlights a forehead portion may be synthesized in a facial region having a long forehead feature.

Accordingly, although a sticker to be synthesized in a camera image is the identical signal content, the content synthesizer 220 may provide a different synthesis result based on a feature of a face recognized in the camera image.

Further, the content synthesizer 220 may recommend synthesizable content to match a corresponding feature based on feature information of a face recognized in a camera image, before the user selects content.

Figure 9:
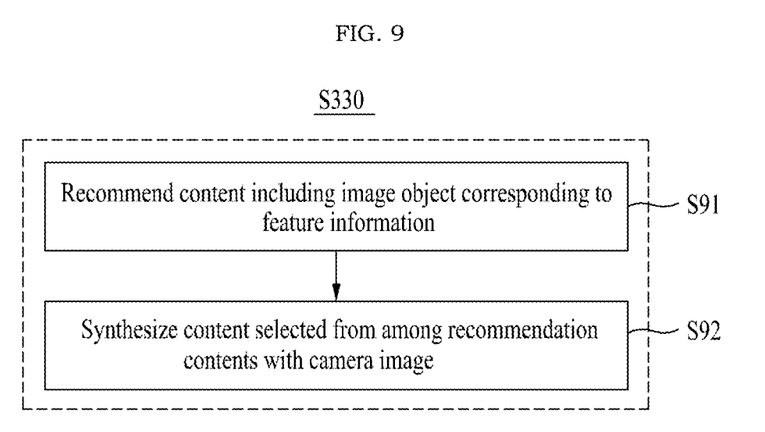
FIG. 9 is a flowchart illustrating an example of a content synthesis process through content recommendation according to an example embodiment.

FIG. 9 is a flowchart illustrating an example of a content synthesis process through content recommendation according to an example embodiment.

In operation S91, the content synthesizer 220 may recommend content including an image object corresponding to the feature information recognized in operation S320. Each piece of content may include facial feature information associated with corresponding content as attribute information and may include an image object capable of applying a different effect for each facial feature. When feature information of the face recognized in the camera image is extracted, the content synthesizer 220 may recommend a content list having an image object that matches the extracted feature.

Figure 10:
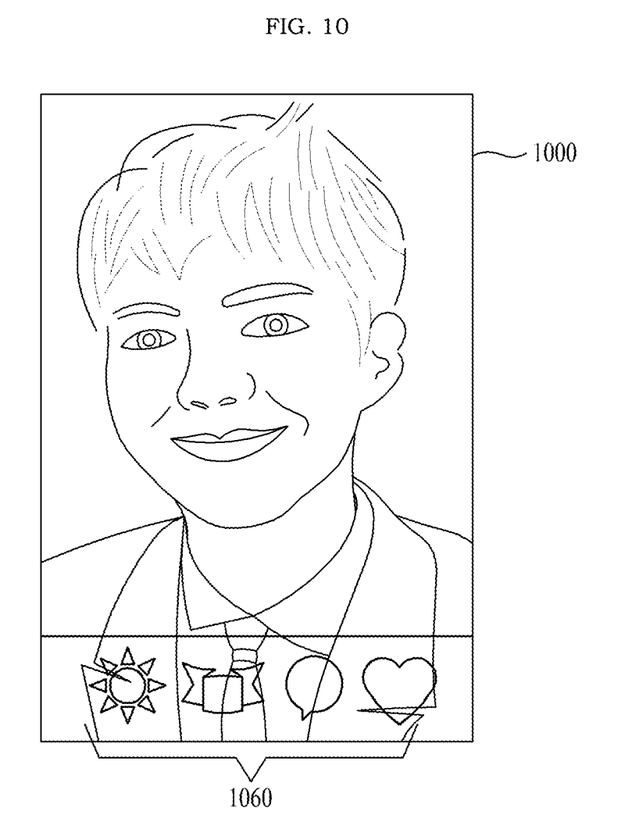
FIG. 10 illustrates an example of a process of recommending content to match a feature of a face recognized in a camera image according to an example embodiment.

For example, referring to FIG. 10, when a face having a long chin feature is recognized in a camera image 1000, a recommendation content list 1060 including an image object capable of highlighting a chin portion in a facial region may be preferentially provided, instead of providing the entire content list. That is, the recommendation content list 1060 may include content of an image object associated with feature information of the face recognized in the camera image.

Referring again to FIG. 9, in operation S92, the content synthesizer 220 may synthesize content selected from among recommendation contents with the camera image. The content synthesizer 220 may synthesize the image object capable of highlighting a corresponding feature with the camera image based on feature information of the face recognized in the camera image.

Accordingly, the content synthesizer 220 may recommend not the entire content list but content including an image object that matches a feature of the face recognized in the camera image, as content synthesizable with the camera image.

According to some example embodiments, it is possible to further enhance a fun element of a face recognition camera by providing a different synthesis result based on a feature of a face recognized in a camera image with respect to a single piece of content considering feature information of the face recognized in the camera image, that is, positions, sizes, and ratios of ears, eyes, mouth, and nose.

The apparatuses described herein may be implemented using hardware components, and/or a combination of hardware components and software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or at least one combination thereof, for independently or collectively instructing or configuring the processing device to operate as desired. Software and/or data may be embodied permanently or temporarily in any type of machine, component, physical equipment, virtual equipment, computer storage medium or device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable storage media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable storage media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. The media may be various recording devices or storage devices in which a single piece or a plurality of pieces of hardware are combined and may be present on a network without being limited to a medium directly connected to a computer system. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A dynamic content providing method performed by a computer-implemented dynamic content providing system, the method comprising:
   recognizing a facial region in an input image;
   extracting feature information of the recognized facial region; and
   dynamically synthesizing an image object of content based on the feature information, the content being synthesizable with the input image, wherein
   the extracting comprises extracting the feature information by calculating face ratio data, and
   the calculating comprises,
      dividing the recognized facial region into a plurality of sections, and
      calculating a ratio between the plurality of sections as the face ratio data.

2. The method of claim 1, wherein the extracting comprises:

calculating the face ratio data based on the facial region;
comparing the face ratio data to reference ratio data; and
extracting the feature information based on a result of the comparing.

3. The method of claim 1, wherein the extracting comprises:
in response to at least two facial regions being recognized in the input image,
calculating the face ratio data with respect to each of the facial regions;
comparing the face ratio data between the facial regions; and
extracting the feature information with respect to each of the at least two facial regions based on a result of the comparing.

4. The method of claim 1, wherein the dynamically synthesizing comprises:
synthesizing the content with the input image; and
providing a different synthesis result with respect to the content based on the feature information in the input image.

5. The method of claim 1, wherein the dynamically synthesizing comprises synthesizing the image object of the content at a position corresponding to the feature information in the input image.

6. The method of claim 1, wherein the dynamically synthesizing comprises applying an effect corresponding to the feature information while synthesizing the image object of the content with the input image.

7. The method of claim 1, wherein the dynamically synthesizing comprises:
in response to at least two facial regions being recognized in the input image,
synthesizing the content with each of the facial regions; and
providing a different synthesis result with respect to each of the at least two facial regions based on the feature information of a corresponding one of the at least two facial regions.

8. The method of claim 1, wherein the dynamically synthesizing comprises recommending the content to be synthesizable with the input image based on the feature information.

9. The method of claim 8, wherein the recommending comprises providing a content list including the image object corresponding to the feature information.

10. A non-transitory computer-readable recording medium having computer program recorded thereon, which when executed by a computer, cause the computer to perform a dynamic content providing method, the dynamic content providing method comprising:
recognizing a facial region in an input image;
extracting feature information of the recognized facial region; and
dynamically synthesizing an image object of content based on the feature information, the content being synthesizable with the input image, wherein
the extracting comprises extracting the feature information by calculating face ratio data, and
the calculating comprises,
dividing the recognized facial region into a plurality of sections, and
calculating a ratio between the plurality of sections as the face ratio data.

11. A computer-implemented dynamic content providing system comprising:
at least one processor configured to,
recognize a facial region in an input image,
extract feature information of the recognized facial region, and
dynamically synthesize an image object of content based on the feature information, the content being synthesizable with the input image, wherein
the at least one processor is configured to extract the feature information by calculating face ratio data, and
the at least one processor is configured to calculate the face ratio data by,
dividing the recognized facial region into a plurality of sections, and
calculating a ratio between the plurality of sections as the face ratio data.

12. The dynamic content providing system of claim 11, wherein the at least one processor is further configured to,
calculate the face ratio data based on the facial region,
compare the face ratio data to reference ratio data, and
extract the feature information based on a comparison result.

13. The dynamic content providing system of claim 11, wherein the at least one processor is further configured to,
in response to at least two facial regions being recognized in the input image,
calculate the face ratio data with respect to each of the facial regions,
compare the face ratio data between the facial regions, and
extract the feature information with respect to each of the at least two facial regions based on a comparison result.

14. The dynamic content providing system of claim 11, wherein the at least one processor is configured to,
synthesize the content with the input image, and
provide a different synthesis result with respect to the content based on the feature information in the input image.

15. The dynamic content providing system of claim 11, wherein the at least one processor is configured to synthesize the image object of the content at a position corresponding to the feature information in the input image.

16. The dynamic content providing system of claim 11, wherein the at least one processor is configured to apply an effect corresponding to the feature information while synthesizing the image object of the content with the input image.

17. The dynamic content providing system of claim 11, wherein the at least one processor is configured to,
in response to at least two facial regions being recognized in the input image,
synthesize the content with each of the facial regions, and
provide a different synthesis result with respect to each of the at least two facial regions based on the feature information of a corresponding one of the at least two facial regions.

18. The dynamic content providing system of claim 11, wherein the at least one processor is configured to recommend the content to be synthesizable with the input image, the content including the image object corresponding to the feature information.

* * * * *